United States Patent [19]

Weber

[11] Patent Number: 5,775,796
[45] Date of Patent: Jul. 7, 1998

[54] TRUCK WITH OVERHEAD STORAGE COMPARTMENT LIGHTING SYSTEM

[75] Inventor: Richard P. Weber, Portland, Oreg.

[73] Assignee: Freightliner Corporation, Portland, Oreg.

[21] Appl. No.: 631,780

[22] Filed: Apr. 12, 1996

[51] Int. Cl.$^6$ .................................................. B60Q 1/00
[52] U.S. Cl. ........................... 362/80; 362/74; 362/83.3
[58] Field of Search ............................... 362/80, 73, 74, 362/83.3, 148, 61, 80.1

[56] References Cited

U.S. PATENT DOCUMENTS

| | | | |
|---|---|---|---|
| 3,358,134 | 12/1967 | Gonyea | 362/73 |
| 4,628,417 | 12/1986 | Kaminski et al. | 362/80 |
| 5,580,153 | 12/1996 | Motz | 362/80 |

OTHER PUBLICATIONS

Photographs of Chrysler Overhead Light Module.
Color photocopies showing portions of the interior of a prior art truck.

*Primary Examiner*—James C. Yeung
*Attorney, Agent, or Firm*—Klarquist Sparkman Campbell Leigh & Whinston

[57] ABSTRACT

A raised roof vehicle has an overhead storage compartment positioned above the windshield area of the vehicle and extending from side to side thereof. A wall or floor of the storage compartment separates the interior of the storage compartment from the portion of the cab at the exterior thereof. At least one plural purpose light source is coupled to the wall and operable to direct light simultaneously through a light diffusing housing into the interior of the overhead storage compartment and through a wall opening to the cab at the exterior of the overhead storage compartment. A light source cover of a light transmitting material overlies the plural purpose light source and cooperates with the lens or globe to substantially enclose the plural purpose light source. The assembly may include at least one red light source coupled to the wall and operable to bathe the instrument panel of the truck with red light. At least one spotlight may also be provided in the assembly. The red light source and spotlight sources may also be provided with light reflective covers cooperating with an associated lens to enclose the respective red light source and spotlight source. Plural openings may be provided through the wall with one such opening being associated with each of the light sources.

26 Claims, 5 Drawing Sheets

TRUCK WITH OVERHEAD STORAGE COMPARTMENT LIGHTING SYSTEM

BACKGROUND OF THE INVENTION

The present invention relates to illumination systems and devices for trucks and more specifically to an illumination system for lighting an overhead storage compartment of a truck and the truck interior.

To provide storage space, trucks are often equipped with elevated storage compartments. In addition, a number of trucks have vaulted or raised roofs to provide additional interior head room. Some of this additional elevated space has heretofore been occupied by overhead storage compartments, such as a compartment extending from side to side of the truck and positioned immediately above the windshield area of the truck. A floor of such overhead storage compartments is typically positioned above and slightly forward of a driver and passenger when seated in their respective vehicle seats.

At night, the interiors of these overhead storage compartments tend to be dark. What little lighting there is for such compartments arrives indirectly from a dome light typically centered in the vehicle cab and spaced some distance away from doors or other openings which lead to the overhead storage compartments. However, a dome light can interfere with the night vision of a driver, as it illuminates the entire cab, including the driver, when on. Therefore, rather than inconveniencing a driver by turning on the dome light, a passenger may instead elect to find objects in the dark overhead storage compartment by feel.

In addition, although it is known to utilize red light to illuminate the footwell area of a truck, and is also known to swivel mount a red light source above the driver side door of a vehicle where it may be directed toward a vehicle dash instrument panel, the red light providing minimal interference with night vision of the driver, mounting a non-white light source to an overhead storage compartment to bathe the instrument panel of a truck is not known to the inventors to have heretofore been practiced.

Therefore, a need exists for a truck with an overhead storage compartment with an improved lighting system and for an improved overhead truck lighting system.

SUMMARY OF THE INVENTION

A truck includes a cab and windshield with an overhead storage compartment positioned within the interior of the truck. The truck may be a raised roof vehicle with the overhead storage compartment extending from side to side of the truck above the windshield. Thus, the overhead storage compartment is positioned above a driver and passenger seated in the vehicle seats and typically somewhat forward of these seats. A wall separates the interior of the overhead storage compartment from the portion of the cab which is exterior to the compartment. The wall may comprise a horizontal floor of the compartment.

An overhead storage compartment illumination system in accordance with the present invention includes a light source or sources positioned to illuminate the overhead storage compartment. More specifically, in a preferred embodiment there are at least two such light sources spaced apart within the overhead storage compartment and operable to simultaneously light the interior of the storage compartment and the portion of the cab outside of the storage compartment.

In accordance with one specific aspect of the present invention, at least one plural purpose light source is coupled to the wall and operable to direct light simultaneously into the interior of the overhead storage compartment and also into the cab exteriorly of the overhead storage compartment when the plural purpose light source is on. In the case of an overhead storage compartment extending from side to side of the truck, typically at least two such plural purpose light sources are utilized, with one being positioned adjacent to a first side of a truck and the other being positioned adjacent to a second side of the truck.

As a more specific aspect of the present invention, an opening may be provided through the wall with a lens or globe positioned in the opening. Light from the plural purpose light source may pass through the opening and lens or globe and into the portion of the cab at the exterior of the overhead storage compartment. In addition, a housing, preferably at least partially of a light-deffusing and light transmitting material, is positioned to overlay the plural purpose light source. The housing protects the plural purpose light source from damage by materials thrown into or otherwise stored in the overhead storage compartment. Light from the plural purpose light source passes through the housing to the interior of the overhead storage compartment when the light source is on, while simultaneously passing through the lens or globe into the interior of the truck cab. In addition, a light source cover at least partially of a light transmissive material may be positioned within the housing and over the plural purpose light source. The light source cover cooperates with the lens or globe to substantially enclose the plural purpose light source within an enclosure or chamber defined between the lens and light source cover.

The lighting system may also include at least one non-white, and preferably red, light source. The non-white source is coupled to the wall and operable to direct red light or light of another color into the cab at the exterior of the overhead storage compartment. More specifically, a red light source is preferably positioned to direct light downwardly so as to bathe the instrument panel and driver with such light during operation of the vehicle and other times, while minimizing interference with the night vision of the driver. The red light source is also most preferably positioned within the housing. In addition, a reflective cover may, in cooperation with a red light source lens positioned in an opening associated with the red light source, substantially enclose the red light source.

As a further aspect of the present invention, the lighting system may include at least one spotlight source for directing a spotlight beam into the interior of the vehicle cab. Most preferably the spotlight source is positioned within the housing. An opening through the wall in association with the spotlight source is typically covered by a spotlight lens or globe. A spotlight source cover cooperates with the spotlight lens or globe to substantially enclose the spotlight source. The spotlight source cover is most preferably of a reflective material.

Thus, in accordance with a more specific aspect of the present invention, plural openings may be provided through the wall, one such opening being associated with each of the plural purpose light source, the red light source, and spotlight source. Light passes through the associated openings from the respective light sources when they are on.

Furthermore, such light source or sources may be mounted to the floor of the overhead storage compartment.

It is therefore an object of the present invention to provide an improved illumination system for an overhead storage compartment of a truck.

Yet another object of the present invention is to provide an illumination system in which non-white light, and most preferably red light, is directed downwardly from a position above a driver so as to illuminate a cab of a vehicle and the instrument panel thereof.

A further object of the present invention is to provide a durable illumination system for an overhead storage compartment of a vehicle.

The present invention relates to the above features, advantages and objects individually or collectively, or both. These and other features, advantages or objects of the present invention will become apparent with reference to the description below.

DETAILED DESCRIPTION OF A PREFERRED EMBODIMENT

Figure 1:
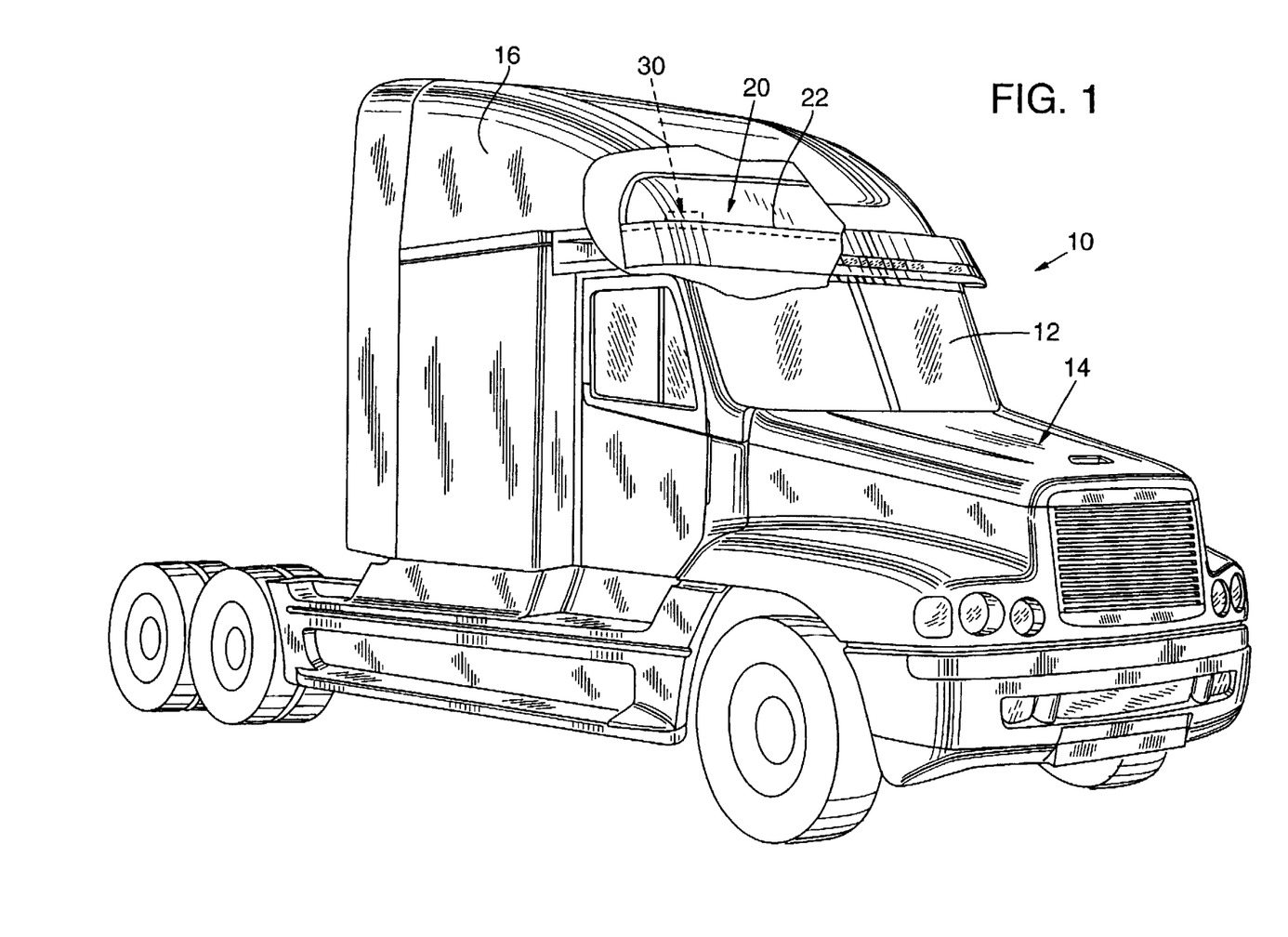
FIG. 1 illustrates a raised roof vehicle having an overhead storage compartment with a first embodiment of an illumination system provided for lighting the interior of the overhead storage compartment.

FIG. 1 illustrates a truck 10 having a windshield 12 and engine containing compartment 14 with an engine (not shown) therein. The truck 10 is of the raised roof type with a vaulted interior ceiling underneath the roof 16.

An overhead storage compartment 20 is positioned in an elevated portion of the cab and may extend from side to side of the vehicle above the windshield 12. The storage compartment 20 is bounded by a wall, which may comprise a horizontal floor 22. This wall separates the overhead storage compartment from the remaining portions of the interior of the cab which are at the outside or exterior of the overhead storage compartment 20. An illumination system is provided for illuminating the overhead storage compartment and most preferably for illuminating both the interior of the cab and also the interior of the overhead storage compartment. One form of an illumination assembly for this purpose is indicated at 30 in FIG. 1. The illumination assembly 30 will be described more specifically below.

Figure 2:
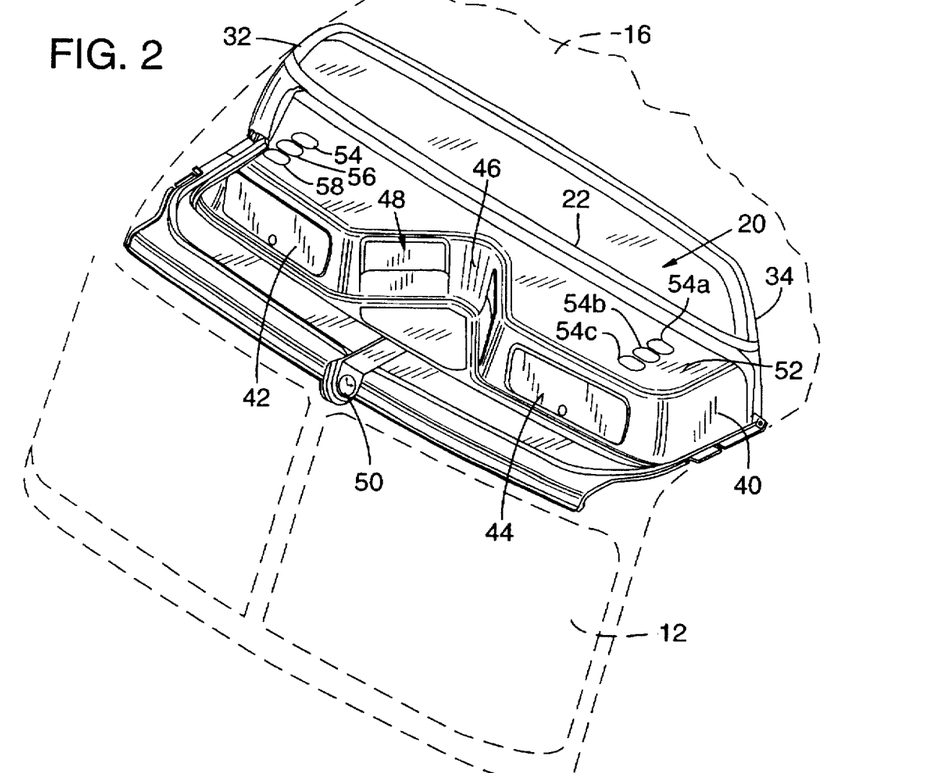
FIG. 2 is a perspective view, looking from below, of one form of an overhead storage compartment with an illumination system of the form shown in FIG. 1.

With reference to FIG. 2, the illustrated overhead storage compartment 20 extends from a first side 32 of the vehicle, across the front of the vehicle and to a second side 34. In addition, a lower overhead console or panel 40 is positioned beneath the overhead storage compartment 20. Console 40 extends forwardly of the compartment 20 in the area immediately above the windshield 12. Console 40 is provided with first and second compartments 42, 44 each closed by a respective door, although they may be closed by netting or simply left open. The compartments 42, 44 are separated by a projecting central section 46, which may be generally triangular in cross-section. A CB radio or the like may be positioned at either side of the projecting central section, such as in the space indicated at 48. A clock 50 is typically centered in the vehicle directly above the windshield of the vehicle where it is readily visible to the driver or passenger. In addition, the ceiling 52 of the lower console 40 is provided with at least one passageway or opening. In the illustrated embodiment, three such openings 54, 56 and 58 are provided and are positioned generally above a driver when a driver is seated in a vehicle, and also above the instrument panel of the vehicle (not shown). A similar set of three openings 54a, 54b and 54c are positioned through ceiling 52 adjacent to the opposite side 34 of the truck from side 32.

Figure 3:
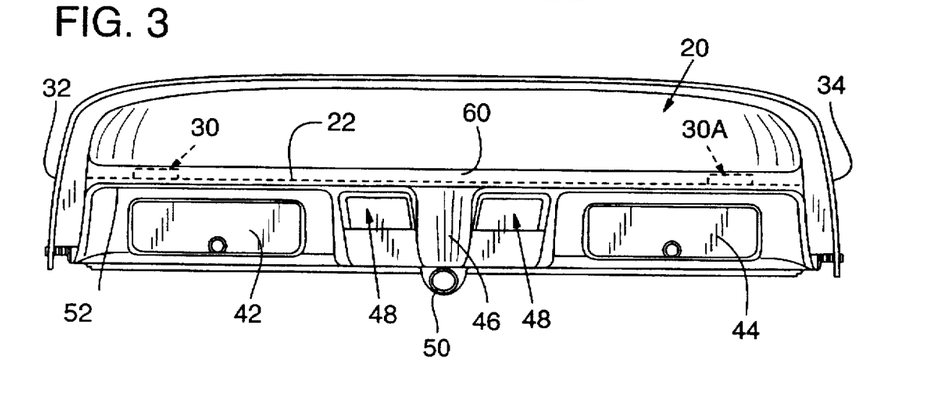
FIG. 3 is a front view of the overhead storage compartment of FIG. 2 with an illumination system in accordance with the FIG. 1 embodiment.

Referring to FIG. 3, a first light assembly 30 is positioned adjacent to the first side 32 of the vehicle and a second light assembly 30a is positioned adjacent to the opposite side of the vehicle 34. Assemblies 30 and 30a are preferably of identical construction. Therefore, only assembly 30 will be described in detail below. As can be seen in FIG. 3, the light assemblies 30 and 30a are spaced apart and are positioned adjacent to the opposite sides 32, 34 of the vehicle. Light assemblies 30, 30a also project upwardly above the floor 22 of the overhead storage compartment. The wall 22 has a generally horizontal floor portion. The wall 22 separates the interior of the overhead storage compartment from the remaining portions of the cab at the exterior of the compartment. The wall also includes a front edge portion 60 which is typically padded and conceals the light assemblies 30, 30a from being seen from below. The light assemblies 30, 30a are positioned to overlie the respective openings 54, 56, 58 and 54a, 54b and 54c.

Figure 4:
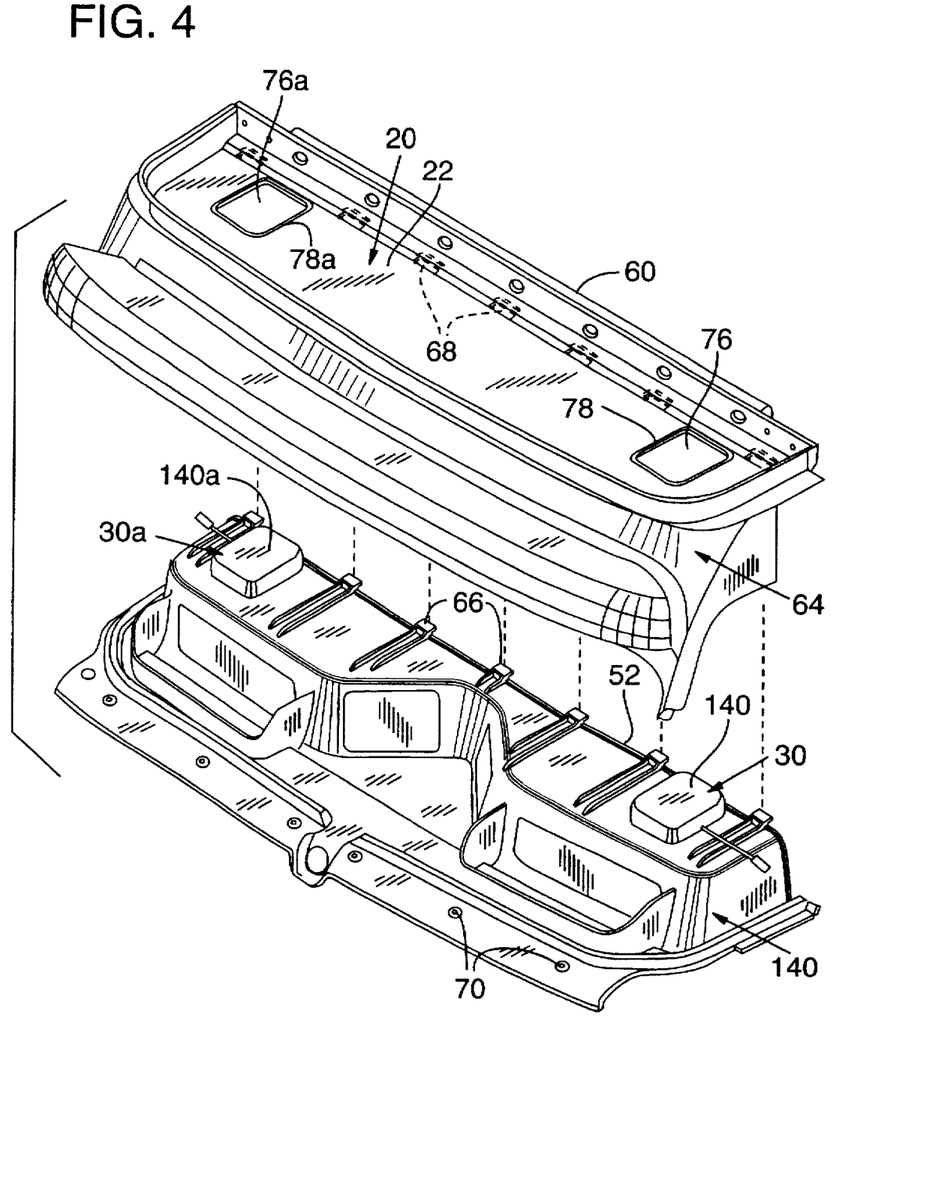
FIG. 4 is a partially exploded view of elements comprising the overhead storage compartment and illustrates the floor of the overhead storage compartment and a subpanel which supports the illumination system of the FIG. 1 embodiment.

FIG. 4 illustrates the back side of the console section 40 (looking from above and toward the rear of the vehicle) and of a console section 64 which includes the floor defining wall section 22. Console section 40 nests within console section 64 when installed. In the illustrated construction, projecting flanges 66 along the upper rear edge of console section 40 are inserted into tab receiving pockets 68 along the edge of console section 64 when the sections are interconnected. Screws or other fasteners, inserted through openings such as several numbered as 70 in FIG. 4, secure the assembled console sections 40, 60 in place to the vehicle frame. A first opening 76 is provided through the floor 22 and a second opening 76a is also provided through the floor. The respective lighting assemblies 30, 30a extend through the respective openings 76, 76a and project upwardly into the interior of the overhead storage compartment when console sections 40 and 64 are assembled. The floor 22 may be provided with a raised ridge 78 bounding the perimeter of opening 76. A similar raised ridge 78a may be provided along the periphery of the opening 76a. Lighting assemblies 30, 30a typically fit snugly through the respective openings 76, 76a. By providing a raised ridge bounding the openings 76, 76a, coins and/or other loose items tend not to migrate toward the lighting assemblies when stored in the overhead storage compartment.

Figure 5:
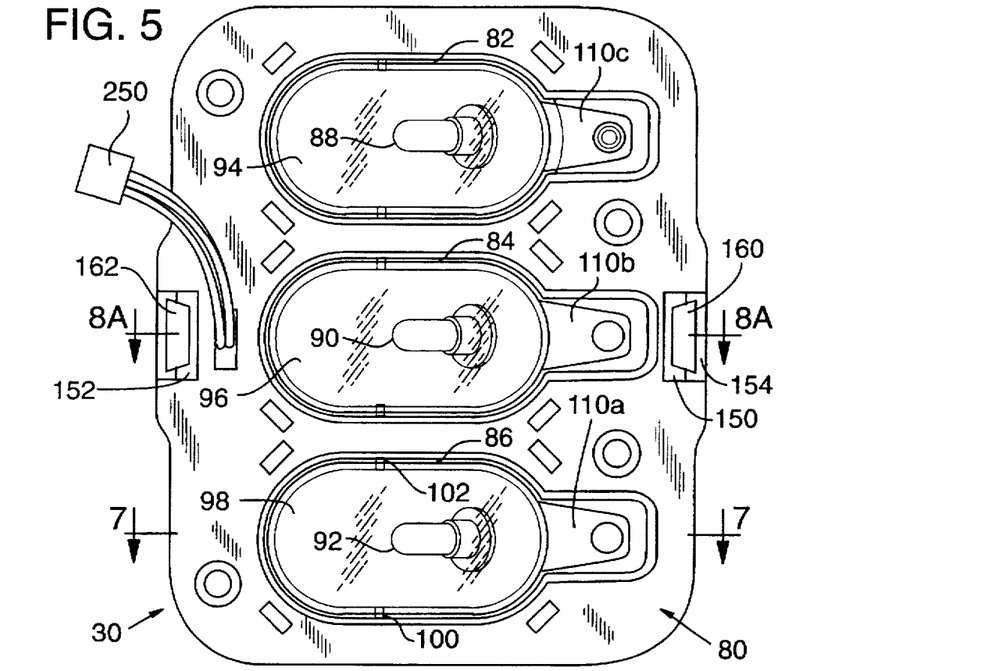
FIG. 5 is a bottom view of a lighting assembly of the FIG. 1 embodiment.

The lighting assembly 30 is shown in FIGS. 5–8. The illustrated assembly includes a base plate 80 having a lower surface as illustrated in FIG. 5. A plurality of openings 82, 84 and 86 are provided through the base plate, each of which is bounded by a respective raised ridge. The openings 82, 84 and 86 are aligned with the respective openings 54, 56 and 58 when the lighting assembly 30 is installed. These openings permit the passage of light from respective light sources, such as lamps 88, 90 and 92, supported above them. Light from these lamps passes through the respective openings and into the portion of the cab outside of the overhead storage compartment. Respective lenses or globes 94, 96 and 98 are positioned within the openings between the associated light sources and the cab interior.

Although the lenses 94, 96 and 98 may be fixedly mounted in place, in the illustrated embodiment they are pivoted to the base 80. For example, lens 98 may be mounted as follows. A pair of pins 100, 102 project outwardly from the ridge bounding the opening 86. The lens 98 includes mounting flanges (such as 102 in FIG. 7) projecting upwardly along each side of the lens. These lens mounting flanges each define a pin receiving slot. The lenses are typically of plastic or other resilient or flexible material so that they may snap-fit onto the respective supporting pins. Thus, lens 98 pivots about a generally horizontal pivot axis defined through the pins 100, 102. The lenses 94 and 96 are supported in a similar manner.

Figure 6:
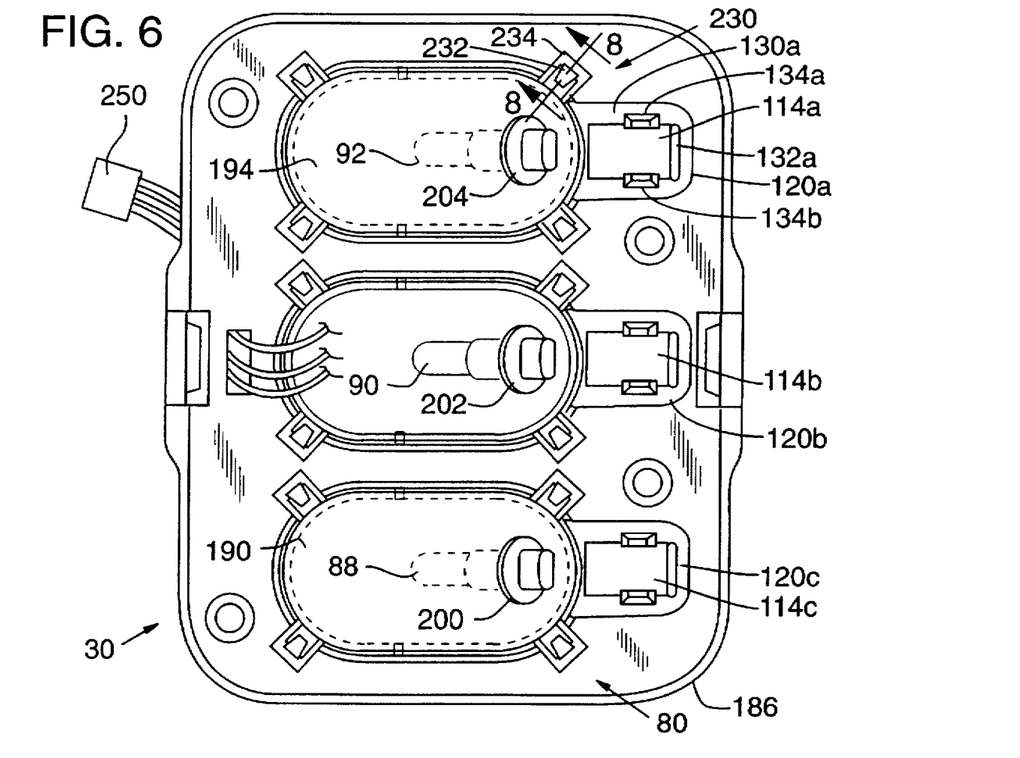
FIG. 6 is a top view of the lighting assembly of FIG. 5.

One end of lens 98 is provided with a switch engaging tab 110. The tab 110 is positioned to engage a pushbutton or plunger 112 of a conventional on-off switch 114a. One suitable switch is manufactured by Judd-Co of Harbor City, Calif. By pushing on a portion of lens 98 between the pivot axis through pins 100, 102 and pushbutton 112, the tab 110 actuates switch 114a via the pushbutton 112 to turn the switch between respective on and off positions. A portion 116 of face plate 80 (to the left of pin 100 in FIG. 7) acts as a stop to limit pivoting of the lens 98. The other lenses 94, 96 are provided with similar switch actuating tabs 110b, 110c for actuating respective switches 114b and 114c (see FIG. 6). Each of the switches 114a, 114b and 114c are supported by a respective switch supporting block 120a, 120b and 120c (see FIGS. 6 and 7). As shown in FIG. 6 for switch 114a, the switch is typically supported on an upper surface 130a of block 120a against an upwardly projecting flange 132a by gripping arms 134a, 134b. The gripping arms retain the switch 114a in place in a snap-fit manner with the distal ends of the gripping arms overlapping the upper surface of the switch.

Figure 7:
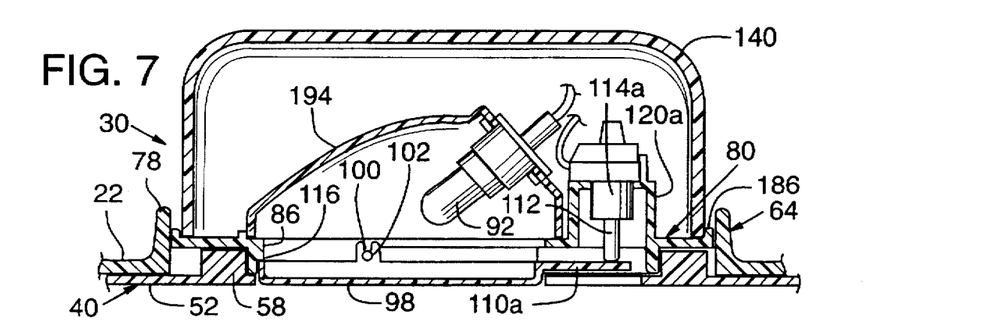
FIG. 7 is a vertical sectional view taken along line 7—7 of FIG. 5.
Figure 8:
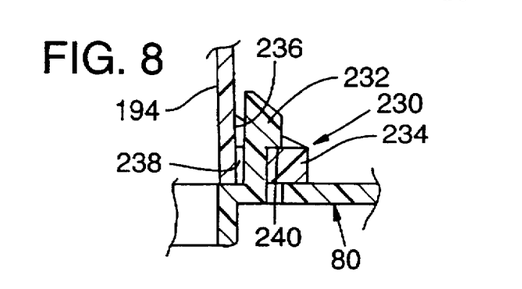
FIG. 8 is a vertical sectional view taken along line 8—8 of FIG. 6 illustrating one manner of attaching light source covers to a supporting plate.
Figure 8A:
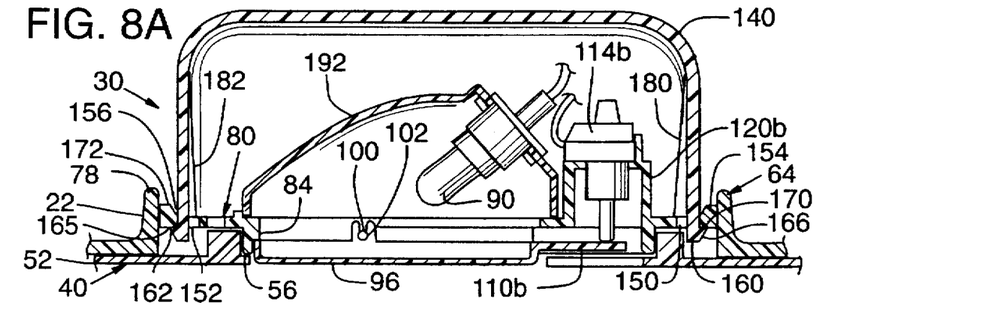
FIG. 8A is a vertical sectional view taken along line 8A—8A of FIG. 5.

As can be seen in FIGS. 7, 8 and 8a, exterior housing 140 is positioned to overlie lamps 88, 90 and 92. As can be seen in FIG. 4, housing 140 protects the lamps from impact from materials that may be tossed or otherwise stored in the overhead storage compartment. Housing 140, in the illustrated form, is of an inverted rectangular dish or dome-like shape. For reasons which will become more apparent below, at least a portion of the housing 140, and most preferably the entire housing, is of a light transmissive and light diffusing material. For example, housing 140 may be of a frosted white glass or plastic material, with plastic being the most preferred material.

The housing 140 preferably snaps onto or is otherwise mounted to the upper surface of base plate 80. For example, in one mounting approach, a pair of opposed openings 150, 152 are provided through base plate 80. The outermost sides of the respective openings 150, 152 are each bounded by a respective base plate section 154, 156 with an upwardly angled or chamfered edge. The lower edge of housing 140 is provided with a pair of opposed projecting flanges 160, 162 with respective upwardly chamfered edges 166, 168 which define shelves 170, 172. When housing 140 is mounted to base plate 80, the surface 166 slides against surface 154 and surface 168 slides against surface 156 until the respective shelves 170, 172 are positioned underneath the bottom surface of base 80, at which time housing 140 is held in place. Housing 140 includes sets of inwardly projecting reinforcing ribs 180, 182, one flange of each set being positioned on either side of the projecting flange 160. The lower edge of ribs 180, 182 and the lower edge of the housing 140 engage the upper surface of the base plate 80. A perimeter flange 186 (see FIGS. 6 and 7) projects upwardly from the upper surface of the base plate 80 and bounds the outer edge of the housing 140. In this manner, an easily assembled durable lighting assembly is provided.

As shown in FIGS. 6, 7 and 8a, each of the light sources or lamps 88, 90 and 92 is provided with a respective cover 190, 192 and 194. The lamps 88, 90 and 92 are supported by respective sockets 200, 202 and 204. These sockets twist into socket supporting openings provided in an upwardly inclined surface of each of the covers 190, 192 and 194. Exemplary sockets are made by Judd-Co. of Harbor City, Calif. The cover 190, in combination with the lens 94, substantially encloses and protects the lamp or light source 88 positioned therein. Similarly, the cover 192, in combination or cooperation with the lens 96, substantially encloses and protects the lamp or light source 90. In the same manner, the cover 194, in combination with the lens 94, substantially encloses and protects the lamp 88.

The covers may be mounted in any convenient manner, such as to the upper surface of base 80 as shown in FIG. 6. For example, a plurality of mounting mechanisms, one being indicated at 230 in FIG. 6, may be provided at spaced apart locations along the cover, such as at four such locations. For example, with reference to FIG. 6 and FIG. 8, the mounting mechanism 230 may include a generally U-shaped projection 234 extending from a side wall 236 of the cover 94. The projection 234 defines a retaining flange receiving opening 238. A locking flange 232, projecting upwardly from the base plate 80, is inserted through opening 238. The flange 232 defines a shelf 240 which rests on top of the upper surface of projection 232 to thereby selectively lock the cover in place.

The lighting assembly preferably includes at least one plural purpose light source. By plural purpose, it is meant a light source capable of providing light both to the interior of the overhead storage compartment and to the portion of the cab at the exterior of the overhead storage compartment. Thus, a lighting assembly designed to cast light upwardly into the overhead storage area and downwardly into the cab is a preferred example of such a plural purpose light source. In a most preferred form, the plural purpose light source utilizes a single lamp to accomplish this plural purpose lighting. In the illustrated embodiment, the centermost lamp 90 comprises one example of such a plural purpose light source. That is, cover 192 overlying this lamp 90 is of a light transmissive material and most preferably is clear, such as being of clear plastic. Consequently, light from lamp 90, when this lamp is on, passes downwardly through the associated lens 96 and into the interior of the cab outside of the overhead storage compartment. In addition, light from lamp 90 passes through cover 192, through the light transmissive portion of housing 140, and into the interior of the overhead storage compartment. Thus, dual purpose lighting is provided by this light assembly 30.

The illumination unit 30 may contain one or more of such dual purpose light sources, but preferably includes only one such source positioned in the center of the illumination assembly 40. The other light sources 88, 92 are optional, but provide additional advantages and features for the illustrated lighting assembly.

In the illustrated embodiment, light source 92 is a non-white light source which provides muted light to the interior of the cab which minimizes interference with the night vision of a driver or occupant of the cab. For example, the lens 98 positioned between light source 92 and the interior of the cab may be colored, with a preferred form of lens 98 being red in color so as to pass red light to the interior of the cab. With reference to FIG. 2, the red light from this source is located above the driver in position to illuminate the instrument and dash area of the vehicle. Most preferably, the red light source is positioned closer to the window area of the vehicle than the other light sources. Although not required, preferably the cover 194 for the red light source has an interior surface which is coated with silver paint or other reflective material. Therefore, light from lamp 92 is blocked from passing through housing 140 and into the interior of the overhead storage compartment. Instead, such light is reflected downwardly into the cab region of the vehicle.

The lamp 88 preferably comprises a spotlight source. Lens 94, like lens 96 of the plural purpose light, is typically clear. The cover 190 overlying the spotlight source 88, like cover 194, is typically coated on its undersurface with a reflective material. This blocks the passage of light from source 88 into the overhead storage compartment. Consequently, a more concentrated spotlight is provided for use by the occupant of the truck.

As can be seen in FIG. 2, spotlight source 88 is typically associated with the opening 54 furthest from the windshield so that light is directed to a location most usable for reading by an occupant of the vehicle.

Figure 9:
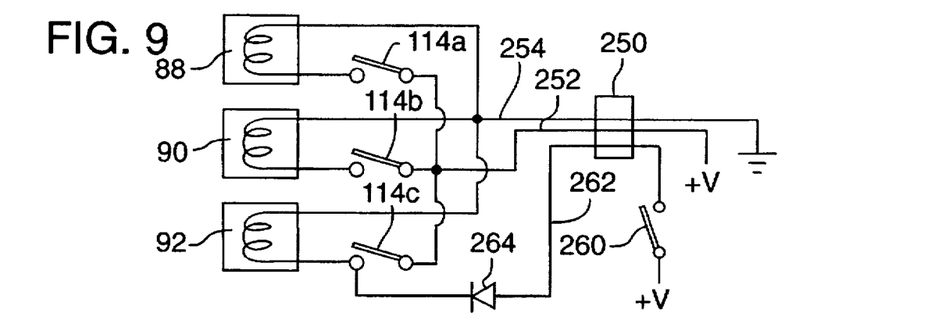
FIG. 9 is an electrical schematic diagram of one form of an electrical circuit utilized to control the operation of the FIG. 5 lighting assembly.

With reference to FIG. 9, in operation, should it be desired to illuminate the interior of the overhead storage compartment, the switch 114b is closed. This provides a circuit from a positive voltage source (e.g. a 12 volt source) through a connector plug 250, a conductor 252, switch 114b, lamp 90, and a conductor 254 and through the plug 250 to ground potential. Under this condition, light from lamp 90 shines upwardly through the housing 140 into the overhead storage compartment and downwardly into the interior of the cab. Should a driver be traveling and desire to illuminate the dash of the vehicle while minimizing the impact on the driver's night vision, switch 114a may be closed. In this case, a circuit is completed from line 252, through switch 114a, the lamp 88 (in this case the red light source) and the conductor 254 to ground potential. Should a driver desire to turn on the spotlight, the switch 114c is closed, completing the circuit from the power source through plug 250, conductor 252, the switch 114c, and conductor 254 to ground potential. Any one of more of these switches may be operated simultaneously as well as independently. In addition, the power source may be connected through a separate switch 260, (for example, one coupled to the door of a vehicle) to a conductor 262, a diode 264, the lamp 90 and the conductor 254 to ground potential. With switch 260 in an operative position, when, for example, the vehicle door is open, the lamp 90 automatically turns on to light the cab of the vehicle. Of course, other lighting circuits will be readily apparent to those of ordinary skill in the art.

Having illustrated and described the principles of our invention with regard to preferred embodiments, it should be apparent to those of ordinary skill in the art that our invention may be modified in arrangement and detail without departing from the invention. Therefore, we claim as our invention all embodiments which fall within the scope of the following claims and equivalents thereto.

I claim:

1. A truck comprising:

a cab having a windshield;

an overhead storage compartment having a wall separating the interior of the overhead storage compartment from the portion of the cab at the exterior of the overhead storage compartment;

at least one plural purpose light source coupled to the wall having a first lamp, the light source being operable to direct light from said first lamp simultaneously into the interior of the overhead storage area and into the cab at the exterior of the overhead storage compartment when said first lamp of the plural purpose light source is on.

2. A truck according to claim 1 in which the wall comprises a horizontal floor of the overhead storage compartment and wherein the plural purpose light source does not project inwardly into the cab from the wall.

3. A truck according to claim 1 which has a raised roof and wherein the overhead storage compartment is positioned within the interior of the truck above the windshield.

4. A truck according to claim 3 in which the overhead storage compartment extends from side to side of the truck and wherein there are at least two such plural purpose light sources, one positioned adjacent to a first side of the truck and the other positioned adjacent to a second side of the truck.

5. A truck comprising:

a cab having a windshield;

an overhead storage compartment having a wall separating the interior of the overhead storage compartment from the portion of the cab at the exterior of the overhead storage compartment;

at least one plural purpose light source coupled to the wall and operable to direct light simultaneously into the interior of the overhead storage area and into the cab at the exterior of the overhead storage compartment when the plural purpose light source is on;

and wherein an opening is provided through the wall, the truck including a lens or globe positioned in the opening through which light passes from the plural purpose light source to the exterior of the overhead storage compartment when the plural purpose light source is on, a light diffusing housing comprised of a light transmissive material positioned to overlay and protect the plural purpose light source from damage by material stored in the overhead storage compartment whereby light from the plural purpose light source passes through the light diffusing housing to the interior of the overhead storage compartment when the plural purpose light source is on.

6. A truck according to claim 5 including a light source cover comprised of a light transmissive material positioned within the light diffusing housing and cooperating with the lens or globe to substantially enclose the plural purpose light source, whereby light passes through the light source cover and through the light diffusing housing to the interior of the overhead storage compartment when the plural purpose light source is on.

7. A truck according to claim 1 including at least one red light source in addition to said first lamp, the red light source being coupled to the wall and operable to direct red light into the cab at the exterior of the overhead storage compartment when the red light source is on.

8. A truck according to claim 7 including at least one spotlight source in addition to said first lamp and in addition to said at least one red light source, the spotlight being coupled to the wall and operable to direct a spotlight beam into the cab at the exterior of the overhead storage compartment when the spotlight source is on, and wherein said first lamp, red light source and spotlight source are positioned within a common housing.

9. A truck comprising:

a cab having a windshield;

an overhead storage compartment having a wall separating the interior of the overhead storage compartment from the portion of the cab at the exterior of the overhead storage compartment;

at least one plural purpose light source coupled to the wall and operable to direct light simultaneously into the interior of the overhead storage area and into the cab at the exterior of the overhead storage compartment when the plural purpose light source is on;

at least one red light source coupled to the wall and operable to direct red light into the cab at the exterior of the overhead storage compartment when the red light source is on;

at least one spotlight source coupled to the wall and operable to direct a spotlight beam into the cab at the exterior of the overhead storage compartment when the spotlight source is on;

a light diffusing housing comprised of a light transmissive material covering the plural purpose light source, the red light source, and the spotlight source to protect such light sources from damage by material stored in the overhead storage compartment.

10. A truck according to claim 9 including a red light source cover of a light reflective material positioned to reflect light from the red light source away from the light diffusing housing and thus away from the interior of the overhead compartment, the truck also including a spotlight source cover of a light reflective material positioned to reflect light from the spotlight source away from the light diffusing housing and thus away from the interior of the overhead compartment.

11. A truck according to claim 10 including a plurality of discrete openings through the wall, one such opening being provided respectively in association with each of the plural purpose light source, the red light source, and the spotlight source, light from the respective plural purpose light source, the red light source, and the spotlight source passing through the respective associated opening when the respective associated plural purpose light source, red light source, and spotlight source are on.

12. A truck according to claim 11 including a red lens or globe positioned to cover the red light source opening and thereby covering the red light source, the red lens or globe cooperating with the red light source cover to substantially enclose the red light source, a spotlight lens or globe positioned to cover the spotlight source opening and thereby covering the spotlight source, the spotlight lens or globe cooperating with the spotlight source cover to substantially enclose the spotlight source, a plural purpose light source lens or globe positioned to cover the plural purpose light source opening and to thereby cover the plural purpose light source, a plural purpose light source cover of a light transmissive material positioned and cooperating with the plural purpose light source lens or globe to substantially enclose the plural purpose light source.

13. A truck comprising:

a cab having a windshield;

an overhead storage compartment above the windshield and having a wall separating the interior of the overhead storage compartment from the portion of the cab at the exterior of the overhead storage compartment;

at least one non-white light source coupled to the wall and operable to direct non-white light from the wall and into the interior of the cab when the non-white light source is on;

in which the at least one non-white light source is a red light source; and in which the wall includes an opening, the red light source being positioned to direct light through the opening, the truck including a red lens or globe positioned within the opening, a light reflective cover covering the red light source and cooperating with the red lens or globe to substantially enclose the red light source, and a housing overlying the red light source cover and thus the red light source, the housing projecting into the overhead storage compartment and protecting the red light source from damage by material stored in the overhead storage compartment.

14. In a truck, a lamp for mounting to the wall of the truck, the wall having at least one light passageway or opening, the wall separating an overhead storage compartment from other portions of the cab of the vehicle, the lamp comprising:

a housing comprised of a light transmissive material for mounting so as to be visible at one side of the wall and at the location of the light passageway;

a lens or globe spaced from the housing and covering the opening;

a lamp positioned between the lens and housing such that when on, light passes through the lens and housing to locations at both sides of the wall and thus into the overhead storage compartment and into the other portions of the cab of the vehicle exteriorly of the overhead storage compartment.

15. A truck comprising:

a cab having a windshield;

an overhead storage compartment having a wall separating the interior of the overhead storage compartment from the portions of the cab at the exterior of the overhead storage compartment;

at least one light source positioned within the overhead storage compartment so as to illuminate the overhead storage compartment; and in which the overhead storage compartment has a floor and plural spaced apart light sources mounted to the floor of the overhead storage compartment, the light sources each having a housing comprised of a light transmissive material covering the respective light source, each housing projecting upwardly from the floor of the overhead storage compartment.

16. A truck comprising:

a cab having a windshield;

an overhead storage compartment having a wall separating the interior of the overhead storage compartment from the portions of the cab at the exterior of the overhead storage compartment, the wall having at least two spaced apart sets of openings; and at least two plural light source assemblies mounted to the wall at spaced apart locations, each light source assembly being associated with a respective one of the sets of spaced apart openings, each of the light source assemblies having a respective first lamp operable to simultaneously direct light through a respective opening of the associated set of openings toward the interior of the cab and also toward the interior of the overhead storage compartment when the first lamp is on.

17. A truck according to claim 16 wherein the wall is a floor of the overhead storage compartment and wherein each of the first lamps is overlaid by a light transmissive housing which protects the overlaid first lamp from damage from materials stored on the floor of the storage compartment and which permits light to pass from the first lamp through the housing and into the interior of the overhead storage compartment.

18. A truck according to claim 17 wherein each set of openings includes respective first, second and third openings, each of the plural light source assemblies has a first lamp directing light through the first opening of the associated set of openings when the first lamp is on, a red light source directing light through the second opening of the associated set of openings when the red light source is on, and a spotlight source directing light through the third opening of the associate set of openings when the spotlight source is on.

19. A truck according to claim 18 in which the plural light assemblies each include respective lenses or globes covering the first, second and third openings.

20. A truck according to claim 19 wherein the respective lenses or globes covering each of the second openings of the sets of openings are red in color to thereby result in red light at the cab interior side of such red colored lenses when the red light sources are on.

21. A truck according to claim 20 in which the lenses or globes are flush with the cab interior surface of the wall.

22. A truck according to claim 20 in which the plural light source assemblies each include a light opaque covering positioned to block the passage of light from the red light source and spotlight source of the plural light source assembly into the interior of the storage compartment.

23. A truck according to claim 22 wherein each of the plural light source assemblies includes a light transmissive housing overlaying the first lamp, the red light source and a spotlight source and the light opaque covering.

24. A truck according to claim 23 in which the housing projects upwardly into the overhead storage compartment.

25. A truck comprising:

a cab having a windshield and a raised roof;

an overhead storage compartment positioned within the interior of the truck and above the windshield, the overhead storage compartment also having a horizontal floor separating the interior of the overhead storage compartment from the portion of the cab at the exterior of the overhead storage compartment; and at least one light assembly comprising:

at least one plural purpose light source coupled to the wall and operable to direct light simultaneously into the interior of the overhead storage area and into the cab at the exterior of the overhead storage compartment when the plural purpose light source is on;

at least one red light source coupled to the wall and operable to direct red light downwardly into the cab at the exterior of the overhead storage compartment when the red light source is on;

at least one spotlight source coupled to the wall and operable to direct a spotlight beam into the cab at the exterior of the overhead storage compartment when the stoplight source is on;

a light diffusing housing of a light transmissive material covering the plural purpose light source, the red light source, and the spotlight source to protect such light sources from damage by material stored in the overhead storage compartment;

a plurality of discrete openings through the wall, one such opening being provided respectively in association with each of the plural purpose light source, the red light source, and the spotlight source, light from the respective plural purpose light source, the red light source, and the spotlight source passing through the respective associated opening when the respective associated plural purpose light source, red light source, and spotlight source are on;

a red light source cover of a light reflective material positioned to reflect light from the red light source through the associated opening and away from the light diffusing housing and thus away from the interior of the overhead compartment;

a spotlight source cover of a light reflective material positioned to reflect light from the spotlight source through the associated opening and away from the light diffusing housing and thus away from the interior of the overhead compartment; and a red lens or globe positioned to cover the red light source opening and thereby covering the red light source, the red lens or globe cooperating with the red light source cover to substantially enclose the red light source, a spotlight lens or globe positioned to cover the spotlight source opening and thereby covering the spotlight source, the spotlight lens or globe cooperating with the spotlight source cover to substantially enclose the spotlight source, a plural purpose light source lens or globe positioned to cover the plural purpose light source opening and to thereby cover the plural purpose light source, a plural purpose light source cover of a light transmissive material positioned and cooperating with the plural purpose light source lens or globe to substantially enclose the plural purpose light source.

26. A truck according to claim 25 in which the overhead storage compartment extends from side to side of the truck and includes a first of said light assemblies positioned at one side of the truck and a second of said light assemblies positioned at the other side of the truck.

* * * * *